United States Patent [19]

Takahashi et al.

[11] Patent Number: 5,404,188
[45] Date of Patent: Apr. 4, 1995

[54] FILM CARTRIDGE AND CAMERA USING FILM CARTRIDGE

[75] Inventors: Shinya Takahashi, Kodaira; Nobuyuki Tanaka, Hidaka, both of Japan

[73] Assignee: Olympus Optical Co., Ltd., Tokyo, Japan

[21] Appl. No.: 112,503

[22] Filed: Aug. 26, 1993

[30] Foreign Application Priority Data

Sep. 4, 1992 [JP] Japan .................. 4-237302

[51] Int. Cl.⁶ .............................................. G03B 17/26
[52] U.S. Cl. ................................ 354/21; 354/105; 354/275
[58] Field of Search ............ 354/21, 275, 94, 105, 354/106

[56] References Cited

U.S. PATENT DOCUMENTS

| | | | |
|---|---|---|---|
| 4,652,104 | 3/1987 | Harvey | 354/106 |
| 5,016,030 | 5/1991 | Dwyer et al. | 354/21 |
| 5,032,855 | 7/1991 | Taniguchi et al. | 354/21 |
| 5,032,862 | 7/1991 | Behnke | 354/275 |
| 5,086,311 | 2/1992 | Naka et al. | 354/94 |

FOREIGN PATENT DOCUMENTS

| | | |
|---|---|---|
| 1233431 | 9/1989 | Japan . |
| 2195344 | 8/1990 | Japan . |
| 36556 | 1/1991 | Japan . |

*Primary Examiner*—David M. Gray
*Attorney, Agent, or Firm*—Kenyon & Kenyon

[57] ABSTRACT

A film having a magnetic recording portion, and a camera using the film. The film is provided with a first indicating member to be broken in response to the loading of the film in the camera, and a second indicating member to be broken in response to a specific photographing, such as panoramic and pseudo-zooming photographing. The camera has a first breaking means for breaking the first indicating member, and a second breaking means for breaking the second indicating member. Thus, it can be easily determined whether the film has been used and whether the above-mentioned special photographing has been performed.

12 Claims, 8 Drawing Sheets

FILM CARTRIDGE AND CAMERA USING FILM CARTRIDGE

BACKGROUND OF THE INVENTION

1. Field of the Invention

This invention relates to a photographic film cartridge for a camera and a camera using the same.

2. Description of the Related Art

In recent years, various types of film cartridges have been introduced in which it can be detected whether the film has been exposed, or the film has been exposed in panoramic image size such as disclosed in U.S. Pat. No. 5,086,311 or in pseudo-zooming image size such as disclosed in U.S. Pat. No. 4,652,104. For example, Japanese Unexamined Patent Publication 2-195344 discloses a film cartridge provided with a deforming member on its outer peripheral surface to be deformed irreversibly by pressure, and a camera capable of using the film cartridge, wherein the film cartridge chamber of the camera is provided at a position corresponding to the location of the deforming member with a deformation driving member for deforming the deforming member, and the driving member is driven in response to closing the back cover of the camera to indicate that the film has been used. Japanese Unexamined Patent Publication 1-233431 discloses a camera with a device for detecting a used film cartridge, which comprises an information recording means for recording, in a predetermined portion of the film cartridge loaded in the cartridge chamber of the camera, at least the information that the cartridge has been used; an information detecting means for detecting the information; and a control means for controlling the detecting means to make the detection before the information recording means records the information. In addition, Japanese Unexamined Patent Publication 3-6556 discloses a film cartridge provided on its one end surface with a thin-film member to be broken by a protruding portion of a camera in response to the loading of the film cartridge in the camera.

However, in Japanese Unexamined Patent Publication 2-195344, while it can be determined whether the film has been exposed or not, it is not proposed to determine whether or not photographing information, such as panorama or pseudo zooming, is magnetically recorded on a magnetic recording portion of the film cartridge. Therefore, if panoramic or pseudo-zooming images are mixed on a roll of film, a processing laboratory cannot determine which equipment should be used for standard image processing or for panoramic and pseudo-zooming image processing. Further, if the film was exposed by the conventional-type camera, it cannot be determined whether the film has been exposed or not. In Japanese Unexamined Patent Publication 1-233431, a magnetic recording portion for recording photographing information and the like is provided on the outer peripheral surface of the film cartridge, and an exposure completion signal, the number of exposed frames and the like are recorded on the magnetic recording portion. Thus, without an apparatus for reading the signal recorded on the magnetic recording portion, the exposure completion information and the like cannot be identified, and the recorded information cannot be recognized by human eyes because it is a magnetic record. While there is shown another method such as recording information by giving pressed deformations in a recording portion on the outer peripheral surface of the film cartridge, the recorded information cannot be detected easily by human eyes. Therefore a device for detecting the pressed deformations is also required, thus the cost of the film cartridge and the camera tends to be high. Furthermore, in Japanese Unexamined Patent Publication 3-6556, while it can be determined whether the film has been exposed or not, there is provided no member for detecting whether a special photographic operation affecting the development and enlargement of the film has been performed: for example, setting the film speed higher than its nominal speed (ISO value) and using a treatment of sensitized development; mixed photographing in standard and panoramic sizes; pseudo-zooming; and the like. Therefore the processing laboratories cannot know whether or not such an operation has been carried out.

OBJECT AND SUMMARY OF THE INVENTION

A first object of the present invention is to solve the above mentioned problems and easily detect the state of film.

A second object of the present invention is to obtain a photographic film cartridge which can easily provide an indication of exposed film and an indication of whether or not panoramic images or pseudo-zooming images are mixed in the film.

A third object of the present invention is to provide a camera having a mechanism for performing the above-mentioned indication.

These objects and advantages of the present invention will become further apparent from the following detailed explanation.

DETAILED DESCRIPTION OF THE PREFERRED EMBODIMENTS

Preferred embodiments of the present invention will be explained below with reference to the accompanying drawing.

Figure 1:
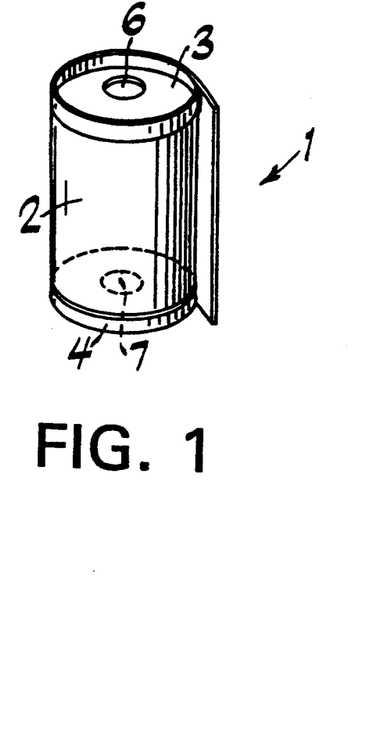
FIG. 1 is a perspective view showing a film cartridge according to a first embodiment of the present invention.
Figure 2:
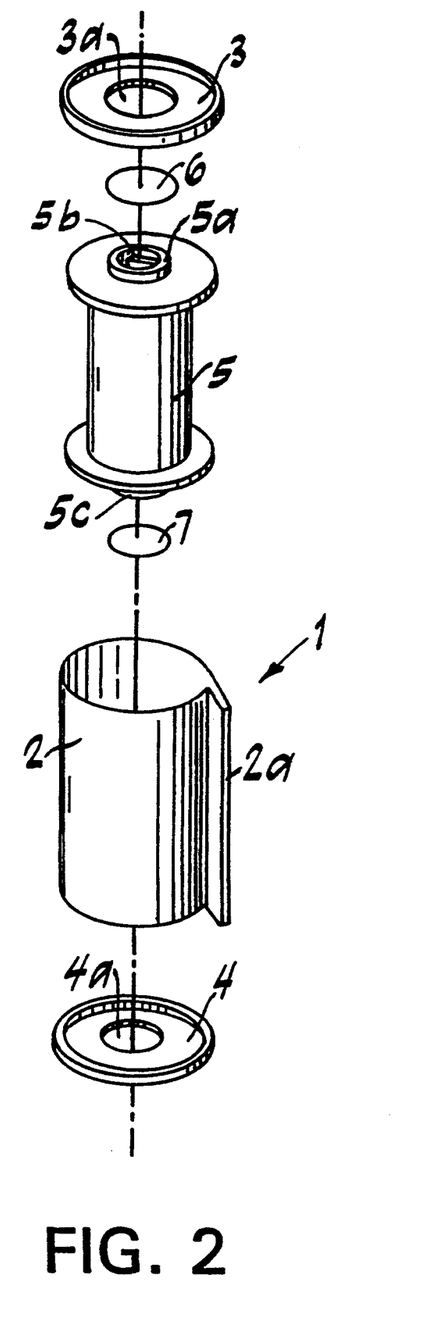
FIG. 2 is an exploded perspective view showing the film cartridge in FIG. 1.

FIG. 1 shows a film cartridge 1 of a first embodiment of the present invention and the film cartridge 1 contains a roll of photographic film having a magnetic recording portion for recording photographic information. FIG. 2 shows the film cartridge 1 disassembled in the longitudinal direction. The main part of the film cartridge 1 comprises a cylindrical body 2; upper and lower caps 3 and 4 fitted on the upper and lower ends of the cylindrical body 2, respectively; a film spool 5 which is arranged in the cylindrical body 2 and on which photographic film (not shown) is to be wound; a load indicating thin film 6 stuck on the upper end surface of the spool 5; and an information indicating thin film 7 stuck on the lower end surface of the spool 5.

Figure 3A:
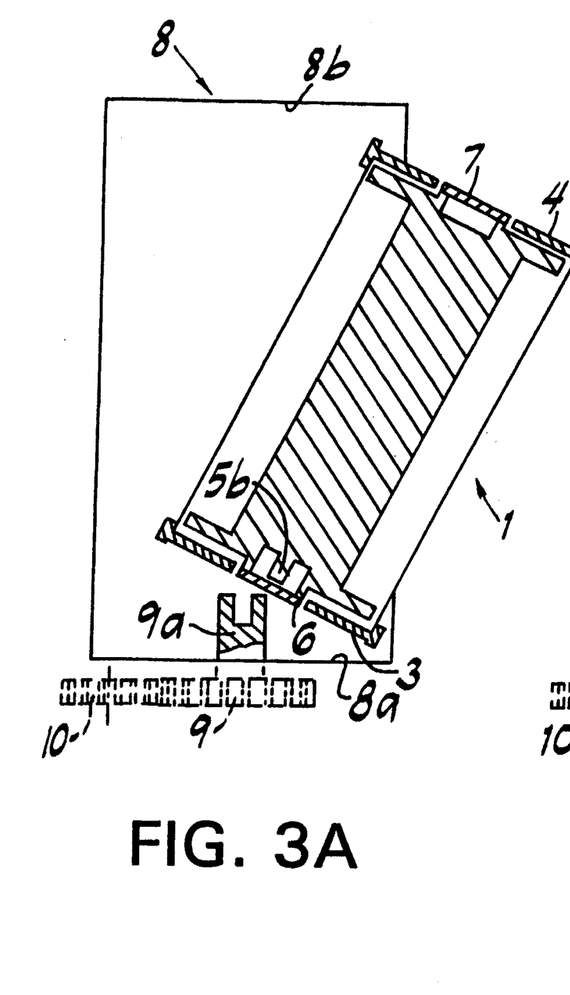
FIGS. 3(A), 3(B) and 3(C) are outlined sectional views showing the process of loading the film cartridge in FIG. 1 into a conventional-type camera having no magnetic recording means.

The cylindrical body 2 has a hollow, almost cylindrical form, and a slit-like film slot 2a for drawing out the film therethrough is provided in a part of the cylindrical body 2 over its entire length. The spool 5 comprises a cylindrical member for winding the film on its peripheral surface; flanges disposed at the upper and lower ends of the cylindrical member for limiting the fluctuation of the wound film; and upper and lower ring-shaped protruding portions 5a and 5c which are on the central axis of the cylindrical member and have a diameter shorter than that of the cylindrical member. In the upper protruding portion 5a, a spool engaging portion 5b formed by a rib arranged in the diametric direction is provided to engage with a spool rotating fork 9a of the camera body (see FIG. 3). All over the upper surface of the upper protruding portion 5c is stuck the load indicating thin film 6 for confirming whether the film cartridge 1 has been loaded in the camera. Furthermore, all over the lower surface of the lower protruding portion 5c is stuck the information indicating thin film 7 for confirming whether photographic information has been magnetically recorded on a magnetic recording portion on the film.

The spool 5 so formed is housed in the cylindrical body 2 with the film having the magnetic recording portion for photographic information being wound on the peripheral surface of the spool 5.

Each of the upper and lower caps 3 and 4 is formed in such a manner that a doughnut-shaped thin plate is fixed within its ring-shaped fitting portion. The upper protruding portion 5a of the spool 5 is rotatably fitted in a central circular hole 3a of the upper cap 3, which is lighttightly fitted on the upper end of the cylindrical body 2. The lower protruding portion 5c of the spool 5 is also rotatably fitted in a central circular hole 4a of the lower cap 4, which is lighttightly fitted on the lower end of the cylindrical body 2.

On the spool 5 so constructed, the roll film having the magnetic recording portion is wound with its rear end fixed to the peripheral surface of the spool 5 and is housed in the film cartridge 1.

Figures 3B, 3C:
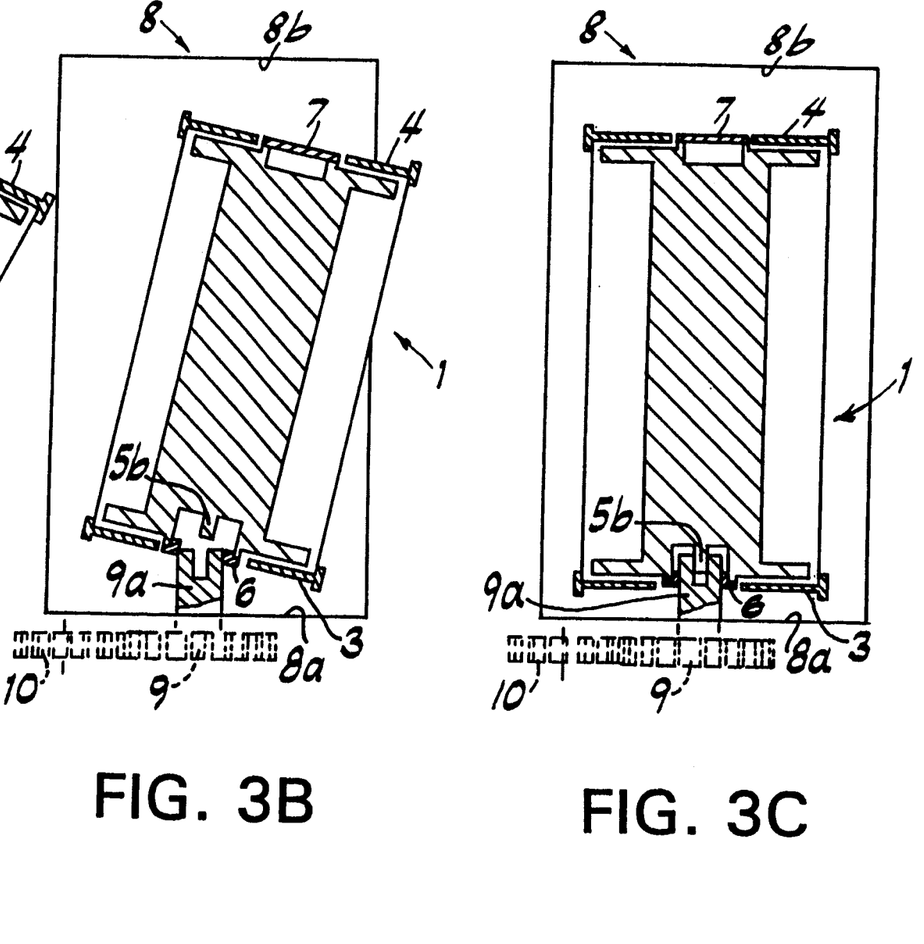

FIGS. 3(A) to 3(C) show the process of loading the above-mentioned film cartridge of the present invention into a conventional camera having no magnetic recording means from its back cover side. This camera is provided with a spool rotating fork 9a at a bottom 8a of a cartridge chamber 8, into which the film cartridge 1 is loaded with the upper and lower caps 3 and 4 facing the bottom 8a and a ceiling 8b, respectively.

The fork 9a to be fitted to the spool engaging portion of the film cartridge 1 is integrally provided in the center of the upper surface of a first gear 9, which is meshed with a second gear 10 coupled with a driving motor (not shown).

FIG. 3(A) shows the state just before the spool engaging portion 5b of the film cartridge 1 meshes with the spool rotating fork 9a while the film cartridge 1 is being loaded in the cartridge chamber 8. FIG. 3(B) shows the state in which the fork 9a has began to fit in the engaging portion 5b to break the load indicating thin film 6. FIG. 3(C) shows the state in which the fork 9a has completely fitted in the engaging portion 5b and the film cartridge has been loaded in the cartridge chamber 8.

If the position of the spool rotating fork 9a does not coincide with and fit in the engaging portion 5b during the film loading, the spool rotating fork 9a fits in the engaging portion 5b when the fork 9a has begun to rotate at the time of film feeding.

In this camera, since the cartridge chamber 8 is not provided on its ceiling 8b with a mechanism for breaking the information indicating thin film 7 stuck on the film cartridge 1, the information indicating thin film 7 is not broken.

Thus, when the film cartridge of the present invention is loaded in a conventional camera having no magnetic recording means, the load indicating thin film is broken, so that it can be confirmed whether the film has been exposed or not.

Figure 4A:
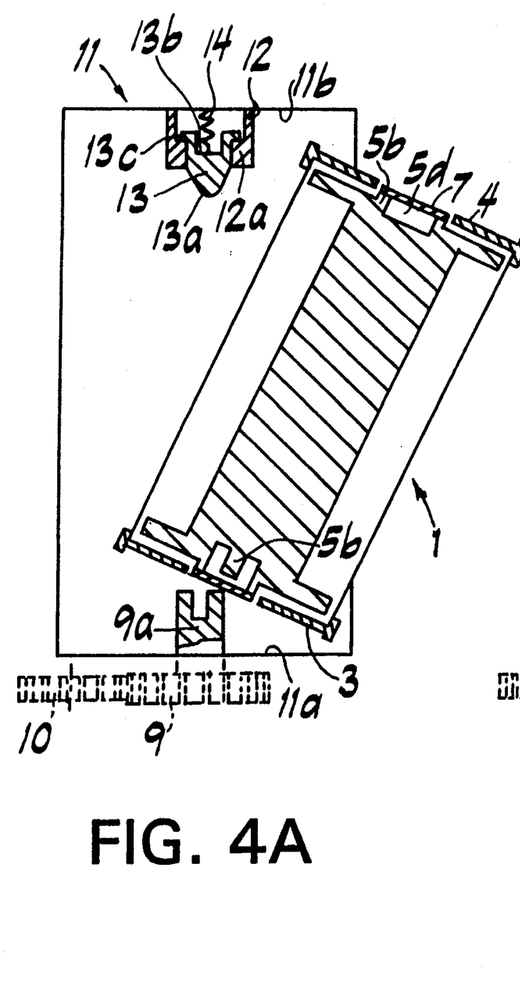
FIGS. 4(A), 4(B) and 4(C) are outlined sectional views showing the process of loading the film cartridge in FIG. 1 into a camera having a magnetic recording means.
Figures 4B, 4C:
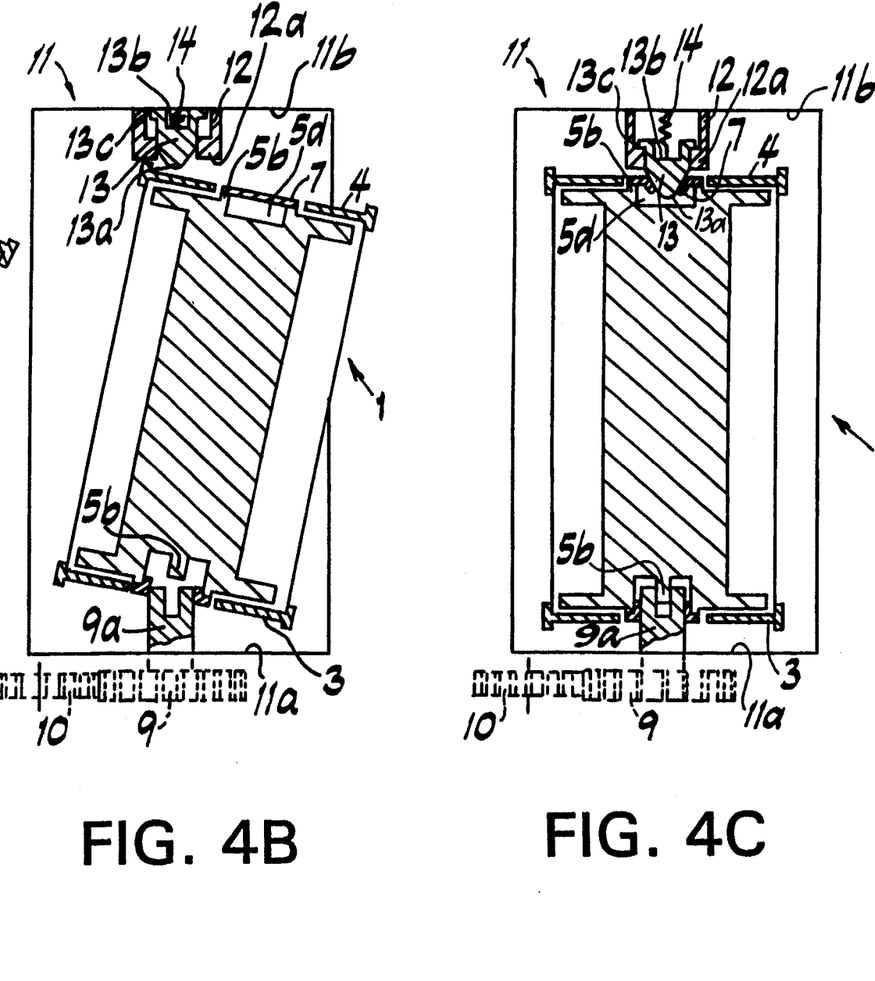

FIGS. 4 (A) to 4 (C) show the process in which the above-mentioned film cartridge of the present invention is loaded in a camera having a magnetic recording means from its back cover side. The cartridge 1 is loaded in this camera in such a manner that a bottom 11a and a ceiling 11b of a cartridge chamber 11 of the camera correspond to the upper and lower caps 3 and 4, respectively.

In this camera, the cartridge chamber 11 is provided in the center of the inner surface of the ceiling 11b with a mechanism for breaking the information indicating thin film 7 of the above-mentioned film cartridge of the present invention. The mechanism comprises a short cylindrical guide member 12 in the center of the ceiling; a protruding member 13 movably fitted in the guide member 12; and a spring 14 pressing the protruding member 13. The guide member 12 has a short cylindrical form with a larger inner diameter and is fixed at its base to the center of the ceiling 11b of the cartridge chamber.

The protruding member 13 is provided at its tip with a cone-shaped protruding portion 13a, and the expansible spring 14 is contained in the guide member 12 so that the protruding portion 13a protrudes from the guide member 12. The spring 14 is press-contacted at its one end to the ceiling of the cartridge chamber and at its other end to a bottom surface 13b of a spring arrangement opening provided on the base side of the protruding member 13. Therefore the protruding member 13 retracts into the guide member 12 when the protruding portion 13a is pressed, and protrudes from the guide member 12 when the pressure is removed. In order to prevent the protruding member 13 from jumping out from the guide member 12, the guide member 12 is provided on its top side with a guide stopper portion 12a protruding inward to have a smaller inner diameter, and a protruding stopper portion 13c formed by a flange provided on the base side of the protruding member 13 engages with the guide stopper portion 12a to stop.

A circular hole in the lower protruding portion 5b forms a spool holding portion 5d into which the protruding portion 13a projects.

The bottom 11a of the cartridge chamber 11 has the same structure as that of the bottom 8a of the cartridge chamber 8 shown in FIG. 3.

The process of loading the film cartridge 1 in the camera so constructed is shown in FIGS. 4 (A) to 4 (C). FIG. 4 (A) shows the state just before the spool engaging portion 5b of the film cartridge 1 meshes with the spool rotating fork 9a while the film cartridge 1 is being loaded in the cartridge chamber 11. FIG. 4 (B) shows the state in which the fork 9a has began to fit in the engaging portion 5b to break the load indicating thin film 6 and just before the protruding member 13 engages with the spool holding portion 5d of the film cartridge 1. FIG. 4(C) shows the state in which the fork 9a has completely fitted in the engaging portion 5b, the information indicating thin film 7 has been broken by the protruding portion 13a of the protruding member 13, the protruding member 13 has engaged with the spool holding portion 5d, and the film cartridge has been loaded in the cartridge chamber 11.

Thus, when the film cartridge of the present invention is loaded in a camera having a magnetic recording means, the load indicating thin film 6 is broken, so that it can be confirmed whether the film has been exposed or not, and the information indicating thin film 7 is broken, so that it can be confirmed whether the film has been exposed by a camera having an information recording means.

In this embodiment, the load indicating thin film 6 and the information indicating thin film 7 are provided on the upper and lower end surfaces of the spool, respectively. However, the load indicating thin film 6 and the information indicating thin film 7 may be provided at appropriate positions of the upper and lower caps 3 and 4, respectively.

On the film having a magnetic recording portion, photographic information such as the trimming area of pseudo-zooming and panoramic photographing can be magnetically recorded by a camera having a magnetic recording means. After exposure, by checking the load indicating thin film and the information indicating thin film, the photographic information magnetically recorded on the magnetic recording portion of the film is read out to automatically determine whether the print is made in a predetermined trimming area or panoramic size.

Figure 5:
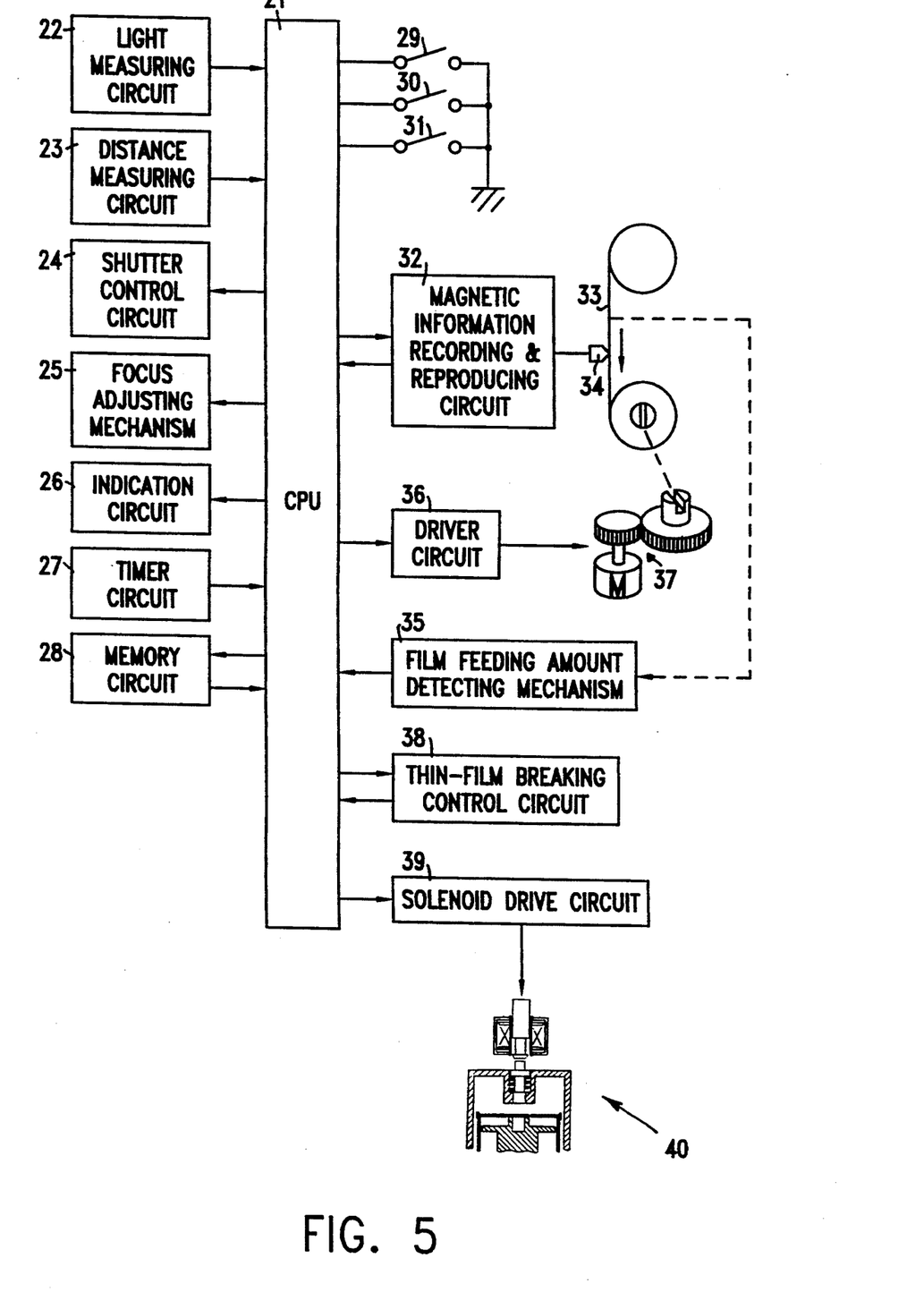
FIG. 5 is a block diagram illustrating a camera in accordance with a second embodiment of the present invention.

FIG. 5 shows a second embodiment of the present invention. In this camera, a brightness data of an object from a light measuring circuit 22 and a distance data of the object from a distance measuring circuit 23 are inputted to a central processing unit (CPU) 21 controlling the whole camera. The CPU 21 outputs a shutter speed data to a shutter control mechanism 24 and a lens moving data to a focus adjusting mechanism 25. These are known.

The CPU 21 outputs various information data to an indication circuit 26 to indicate various information such as photographic information, dates and the like. A timer circuit 27 outputs a date data produced in the timer circuit 27 to the CPU 21. In order to temporarily store magnetically recorded information, the information is outputted from the CPU 21 to a memory circuit 28 formed by an electrically erasable/programable read only memory (EEPROM) and outputted from the memory circuit 28 to the CPU 21. An ON/OFF signal of each of a light-measuring and distance-measuring start switch 29, an exposure start switch 30 and a film-rewinding start switch 31 is inputted to the CPU 21.

At the time of photographing, a photographic information signal detected by a detecting means (not shown) is outputted from the CPU 21 to a magnetic information recording and reproducing circuit 32, and a data signal reproduced is inputted from the magnetic information recording and reproducing circuit 32 to the CPU 21. A photographic information drive signal is outputted from the magnetic information recording and reproducing circuit 32 to a magnetic head 34 for recording and reproducing photographic information on and from a magnetic recording portion of a film 33, and a magnetic signal reproduced from the photographic information magnetically recorded on the magnetic recording portion is inputted to the magnetic information recording and reproducing circuit. A film feeding amount data signal is inputted to the CPU 21 from a film feeding amount detecting mechanism 35 for detecting the film feeding amount at the time of film winding (frame by frame) and rewinding. On the basis of the film feeding amount data signal, the CPU 21 outputs to a drive circuit 36 a film feeding signal for feeding the film. The drive circuit 36 outputs a film feeding drive signal to a film feeding mechanism 37 to wind (frame by frame) or rewind the film.

The CPU 21 outputs to a thin-film breaking control circuit 38 an instruction signal for judging whether the photographic information has been magnetically recorded or not. If the thin-film breaking control circuit 38 judges that the photographic information has been magnetically recorded, a signal representing that the photographic information has been magnetically recorded is inputted from the thin-film breaking control circuit 38 to the CPU 21. In response to the signal, the CPU 21 outputs to a solenoid drive circuit 39 a signal for driving a thin-film breaking mechanism 40 for breaking the information indicating thin film 7 stuck on the film cartridge 1 of the present invention. The thin-film breaking mechanism 40 will be explained later.

Figure 6:
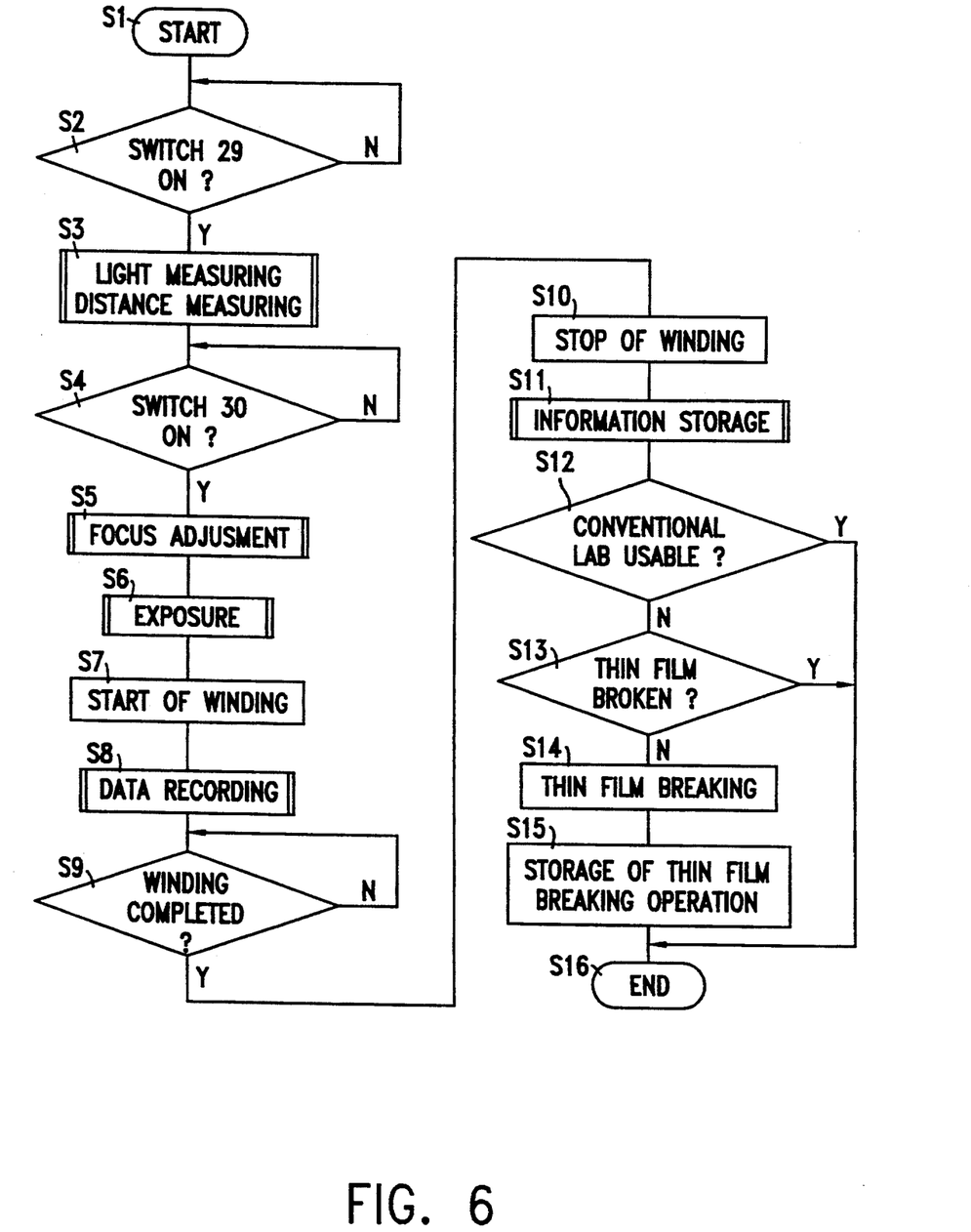
FIG. 6 is a flow chart illustrating a sequence of photographic operation of the camera in FIG. 5.

Next, the operation of the camera so constructed is explained with reference to the flow chart in FIG. 6. In step S1, the sequential operation starts and proceeds to step S2. In step S2, it is confirmed whether the light-measuring and distance-measuring start switch 29 is turned on, and if the switch is turned on, the operation proceeds to step S3. In the subroutine of step S3, the object brightness and the object distance are measured to proceed to step S4. In step S4, it is confirmed whether the exposure start switch 30 is turned on, and if the switch 30 is turned on, the operation proceeds to step S5. In the subroutine of step 5, the focus adjustment of the taking lens is performed to proceed to step S6. In the subroutine of step 6, the film is exposed to the object image to proceed to step S7.

In step S7, the film winding mechanism 37 starts to wind the film 33 to proceed to step S8. In the subroutine of step S8, while the film 33 is being wound, the photographic information data signal is outputted from the CPU 21 to the magnetic information recording and reproducing circuit 32 and recorded on the magnetic recording portion of the film 33 by the magnetic head 34, and the operation proceeds to step S9. In step S9, it is confirmed whether the film winding is completed, and the process proceeds to step S10. In step 10, the film winding mechanism 37 stops the winding of the film 33 to proceeds to step S11. In the subroutine of S11, the photographic information data recorded on the magnetic recording portion of the film 33 is stored in the memory circuit 28 from the CPU 21 to proceed to step S12. In step S12, the thin-film breaking control circuit 38 judges whether such photographic information as panoramic photographing or pseudo-zooming is magnetically recorded on the film and whether the conventional laboratory equipment can be used to process the film. If it is judged that such photographic information is not recorded and the conventional laboratory equipment can be used, the operation proceeds to step S16 to end the sequence.

If in step S12 it is judged that such photographic information is recorded and the conventional laboratory equipment cannot be used, the operation proceeds to step S13. In step S13, it is determined whether in response to the solenoid drive circuit 39 the thin-film breaking mechanism 40 has already broken the thin film, and if the thin-film breaking mechanism 40 has performed the operation of breaking the film, the operation proceeds to step S16 to end the sequence. If in step S13 it is determined that the thin-film breaking mechanism 40 has not performed the operation of breaking the thin film, the operation proceeds to step S14. In step S14, the solenoid drive circuit 39 is controlled to drive the thin-film breaking mechanism 40 to break the information indicating thin film 7 stuck on the film cartridge 1, and the process proceeds to step S15. In step S15, the data representing that the operation of breaking the information indicating thin film 7 has been performed is stored in the memory circuit 28, and the operation proceeds to step S16 to end the sequence.

Alternatively, the above sequence may be simplified by omitting steps S13 and S15. That is, if in step S12 it is judged that the conventional laboratory equipment cannot be used, the operation of breaking the information indicating thin film 7 is performed in step S14 irrespective of whether the information indicating thin film 7 has been broken or not.

Figure 7:
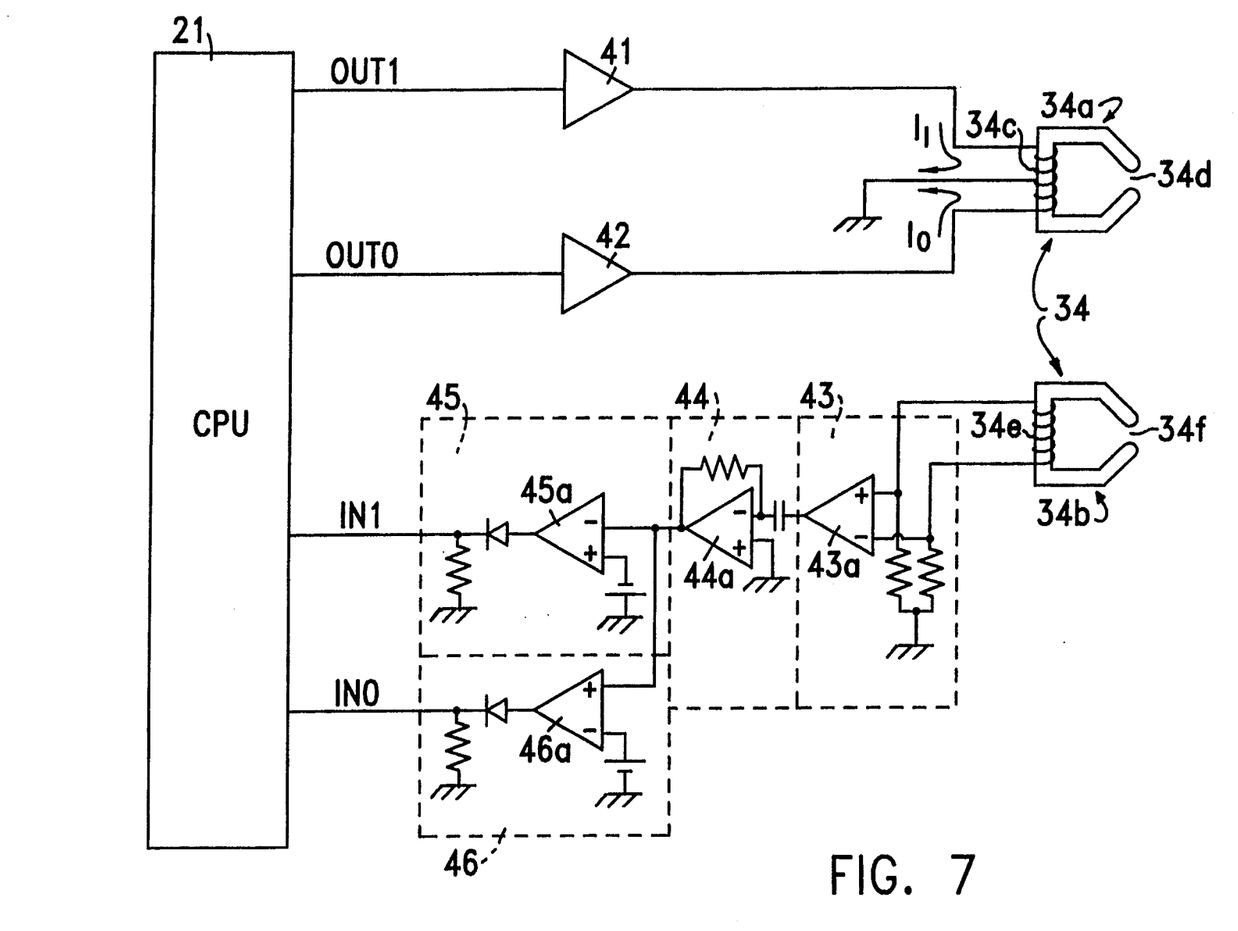
FIG. 7 is an electric circuit diagram illustrating the configuration of a magnetic recording and reproducing circuit of the camera in FIG. 5.
Figure 8:
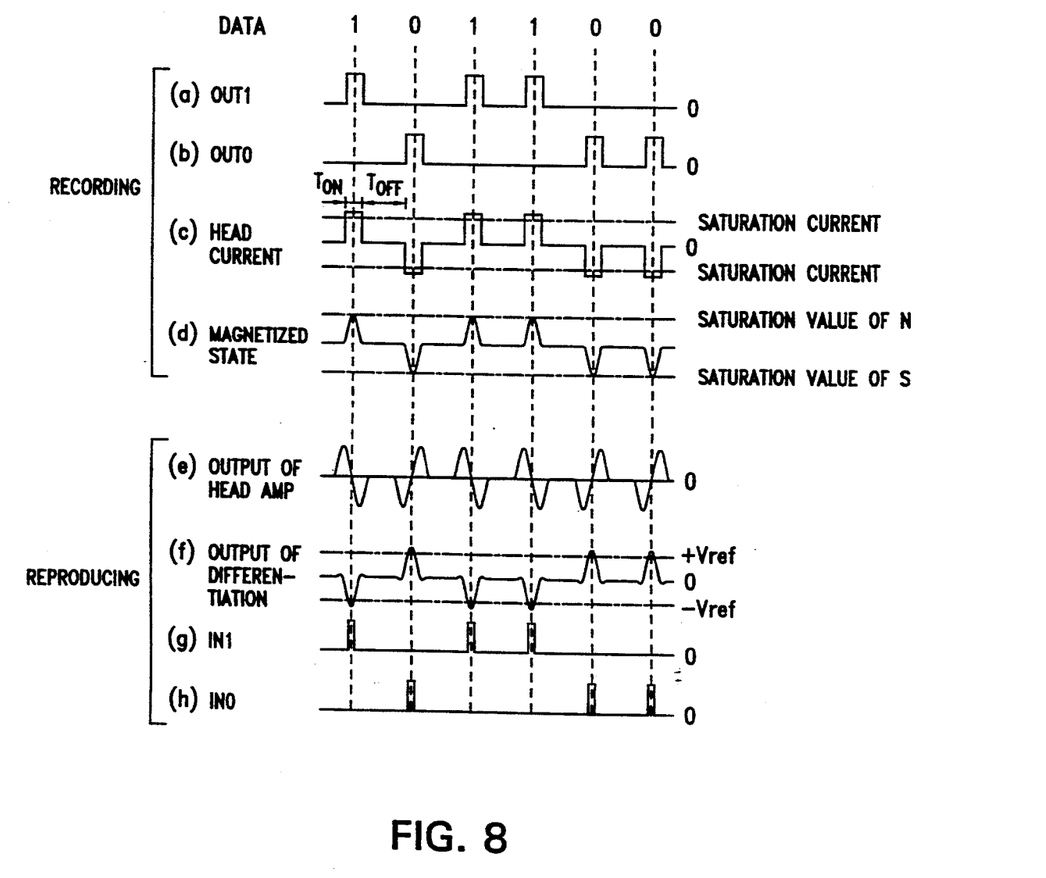
FIG. 8 is a timing chart illustrating the operating wave forms of respective sections of the recording and reproducing circuit in FIG. 7.

FIGS. 7 and 8 illustrate a method of magnetically recording the photographic data on the magnetic recording portion of the film 33 and a method of magnetically reproducing the photographic data magnetically recorded on the magnetic recording portion of the film 33. In this method, three kinds of states, i.e., the magnetized state in the N orientation, the magnetized states in the S orientation, and the non-magnetized state can be recorded on the magnetic recording portion as a magnetic recording medium on the film (not shown). The magnetic head 34 comprises a magnetic recording head 34a and a magnetic reproducing head 34b.

First, the circuit for magnetically recording the photographic information shown in FIG. 7 will be explained. An input terminal of a buffer 41 is connected to an output port OUT1 of the CPU 21, and an output terminal of the buffer 41 is connected to one terminal of an exciting coil 34c of the magnetic recording head 34a. A gap portion 34d of the magnetic recording head 34a is disposed so as to contact the magnetic recording portion of the film. An input terminal of a buffer 42 is connected to an output port OUT0, and an output terminal of the 42 is connected to the other terminal of the exciting coil 34c of the magnetic recording head 34a. The neutral terminal of the exciting coil 34c of the magnetic recording head 34a is connected to the ground.

Next, the circuit for magnetically reproducing the photographic information will be explained. Both terminals of an exciting coil 34e coiled around the magnetic reproducing head 34b are connected to input terminals of a head amplifier 43, respectively. An output terminal of the head amplifier 43 is formed by an output terminal of an operational amplifier 43a, and inverting and non-inverting input terminals of the operational amplifier 43a for differential amplification are connected to the coil 34e and to the ground via respective resistors. The output terminal of the operational amplifier 43a is connected to one terminal of a capacitor in a differentiating circuit 44. The other terminal of the capacitor is connected to an inverting input terminal of an operational amplifier 44a for differentiation. An output terminal of the operational amplifier 44a is connected to one terminal of a resistor, and the other terminal of the resistor is connected to the inverting input terminal of the operational amplifier 44a, while a non-inverting input terminal of the operational amplifier 44a is grounded.

The output terminal of the operational amplifier 44a is connected to an inverting input terminal of a comparator 45a in a comparator circuit 45 to invert its output, and to a non-inverting input terminal of a comparator 46a in a comparator circuit 46 not to invert its output. A non-inverting input terminal of the comparator 45a is connected to a negative power supply. An output terminal of the comparator 45a is connected to the anode of a diode, the cathode of the diode is connected to an input port IN1 of the CPU 21, and a resistor is connected between the input port IN1 and the ground. An inverting input terminal of the comparator 46a is connected to a positive power supply. An output terminal of the comparator 46a is connected to the anode of a diode, the cathode of the diode is connected to an input port IN0 of the CPU 21, and a resistor is connected between the input port IN0 and the ground.

The magnetic information recording circuit and the magnetic information reproducing circuit are configured as described above. Fist, the operation of the magnetic information recording circuit will be explained. Let the magnetized states in the N and S orientations recorded on the magnetic recording portion of the film represent "1" and "0", respectively. When "1" represented by the magnetized state in the N orientation is recorded on the magnetic recording portion of the film, an H (high level) signal is outputted from the output port OUT1 of the CPU 21 to the buffer 41, the magnetic recording head 34a is biased by the buffer 41, and a current I1 flows through the exciting coil 34c of the magnetic recording head 34a and the neutral terminal to the ground. Thus, a magnetic flux is generated in the gap portion 34d of the magnetic recording head 34a to record "1" represented by the magnetized state in the N orientation on the magnetic recording portion of the film.

When "0" represented by the magnetized state in the S orientation is recorded on the magnetic recording portion of the film, an H (high level) signal is outputted from the output port OUT0 of the CPU 21 to the buffer 42, the magnetic recording head 34a is biased by the buffer 42, and a current I0 having a direction opposite to that of the current I1 flows through the exciting coil 34c of the magnetic recording head 34a and the neutral terminal to the ground. Thus, a magnetic flux having a direction opposite to that of the magnetic flux generated by the current I1 is generated in the gap portion 34d of the magnetic recording head 34a to record "0" represented by the magnetized state in the S orientation on the magnetic recording portion of the film. When neither of the output ports OUT1 and OUT0 of the CPU 21 outputs an H signal, no current flows through the exciting coil 34c of the magnetic recording head 34a, so that no magnetic flux is generated in the gap portion 34d of the magnetic recording head 34a and neither of the magnetized states in the N and S orientation is recorded on the magnetic recording portion of the film.

Next, the operation of the magnetic information reproducing circuit will be explained. When the magnetic recording portion of the film (not shown) passes by the gap portion 34f formed in the magnetic reproducing head 34b, the magnetic field in the gap portion 34f varies to change the magnetic flux in the magnetic reproducing head 34b. The change of the magnetic flux causes a current to flow in the exciting coil 34e coiled around the magnetic reproducing head 34b, and in the head amplifier 43, signal voltages are generated at the non-inverting and inverting input terminals of the operational amplifier 43a, and the difference between the voltages at the non-inverting and inverting input terminals is differentially amplified and outputted to the differentiating circuit 44.

The differentially amplified signal is differentiated in the differentiating circuit 44 and outputted to the comparator circuits 45 and 46. The signal differentiated by the differentiating circuit 44 is inputted to the comparator 45. If the signal voltage is lower than the negative reference voltage (−Vref) at the non-inverting input terminal of the comparator 45a, an H signal is outputted and inputted to the input port IN1 of the CPU 21. The signal differentiated by the differentiating circuit 44 is also inputted to the comparator 46. If the signal voltage is higher than the positive reference voltage (+Vref) at the inverting input terminal of the comparator 46a, an H signal is outputted and inputted to the input port IN0 of the CPU 21.

Although the magnetized states of "1" and "0" can be recorded by the output of an output port of one bit, an output port of two bits may be used to indicate three states, i.e., the magnetized state in the N orientation "1", the magnetized state in the S orientation "2", and the non-magnetized neutral state. Thus, by providing and detecting the state which is neither "1" nor "0", it acts as a free-running synchronous clock, so that no external synchronous clock is necessary.

With reference to the timing chart of FIG. 8, the magnetized state of the magnetic record on the magnetic recording portion of the film will be explained. A square-wave H signal of a duration TON is outputted from the CPU 21 to the output port OUT1 or the output port OUT0 at regular intervals T. If the time interval in which no H signal is outputted to the ports OUT1 and OUT0 is represented by $T_{OFF}$, then $T = T_{ON} + T_{OFF}$. If the H signals outputted to the ports OUT1 and OUT0 are represented by "1" and "0", respectively, the data signal "1, 0, 1, 1, 0, 0" is outputted from the CPU 21 to the output ports. When the data from the CPU 21 is "1", the output port OUT1 outputs an H signal with respect to 0 (the low level) as shown in FIG. 8(a); when the data from the CPU 21 is "0", the output port OUT0 outputs an H signal as shown in FIG. 8(b).

In FIG. 8(c), the directions of the currents flowing from the buffers 41 and 42 to the exciting coil 34c of the magnetic recording head 34a in response to the signals from the output ports OUT1 and OUT0 are shown in such a manner that I1 and I0 are the currents in the positive and negative directions, respectively. That is, with respect to the 0 level (ground), when the output port OUT1 outputs an H level signal representing the data "1", a square-wave positive current exceeding the positive saturation level flows through the exciting coil 34c, and when the output port OUT0 outputs an H level signal representing the data "0", a square-wave negative current exceeding the negative saturation level flows through the exciting coil 34c.

The magnetized states of the magnetic recording portion of the film is shown in FIG. 8(d). Let the magnetized states in the N and S orientations be defined as the positive and negative directions, respectively. Corresponding to FIG. 8(c), if the current flowing through the exciting coil 34c is in the positive direction representing the data "1" the signal has a pulse wave form reaching the positive magnetic saturation level, and if the current flowing through the exciting coil 34c is in the negative direction representing the data "0" the signal has a pulse wave form reaching the negative magnetic saturation level.

Next, with reference to the timing chart of FIG. 8, the magnetic reproducing operation from the magnetic recording portion of the film will be explained. When the reproducing head 34b receives the magnetization signals in the N and S orientations magnetically recorded on the magnetic recording portion of the film, magnetic flux changes in opposite directions in accordance with the N and S orientations, so that currents in opposite directions flow through the exciting coil 34e.

As shown in FIG. 8(e), when the magnetization signal varies in the N orientation, the output signal of the head amplifier 43 rapidly falls down from the positive level to the negative level. At this time, as shown in FIG. 8(f), the differentiating circuit 44 differentiates the falling of the signal to output a negative pulse wave form. If the negative pulse wave form is lower than the negative reference voltage (−Vref), as shown in FIG. 8(g), an H signal is invertedly outputted from the comparator circuit 45 and inputted to the input port IN1 of the CPU 21.

On the other hand, when the magnetization signal varies in the S orientation as shown in FIG. 8 (e), the output signal of the head amplifier 43 rapidly rises up from the negative level to the positive level. At this time, as shown in FIG. 8(f), the differentiating circuit 44 differentiates the rising of the signal to output a positive pulse wave form. If the negative pulse wave form is higher than the positive reference voltage (+Vref), as shown in FIG. 8(h), an H signal is outputted from the comparator circuit 46 and inputted to the input port IN0 of the CPU 21.

In this way, an H signal is sequentially inputted to the input ports IN1, IN0, IN1, IN1, IN0 and IN0 of the CPU 21. Therefore, the data "1, 0, 1, 1, 0, 0" is inputted to the CPU 21.

Figure 9:
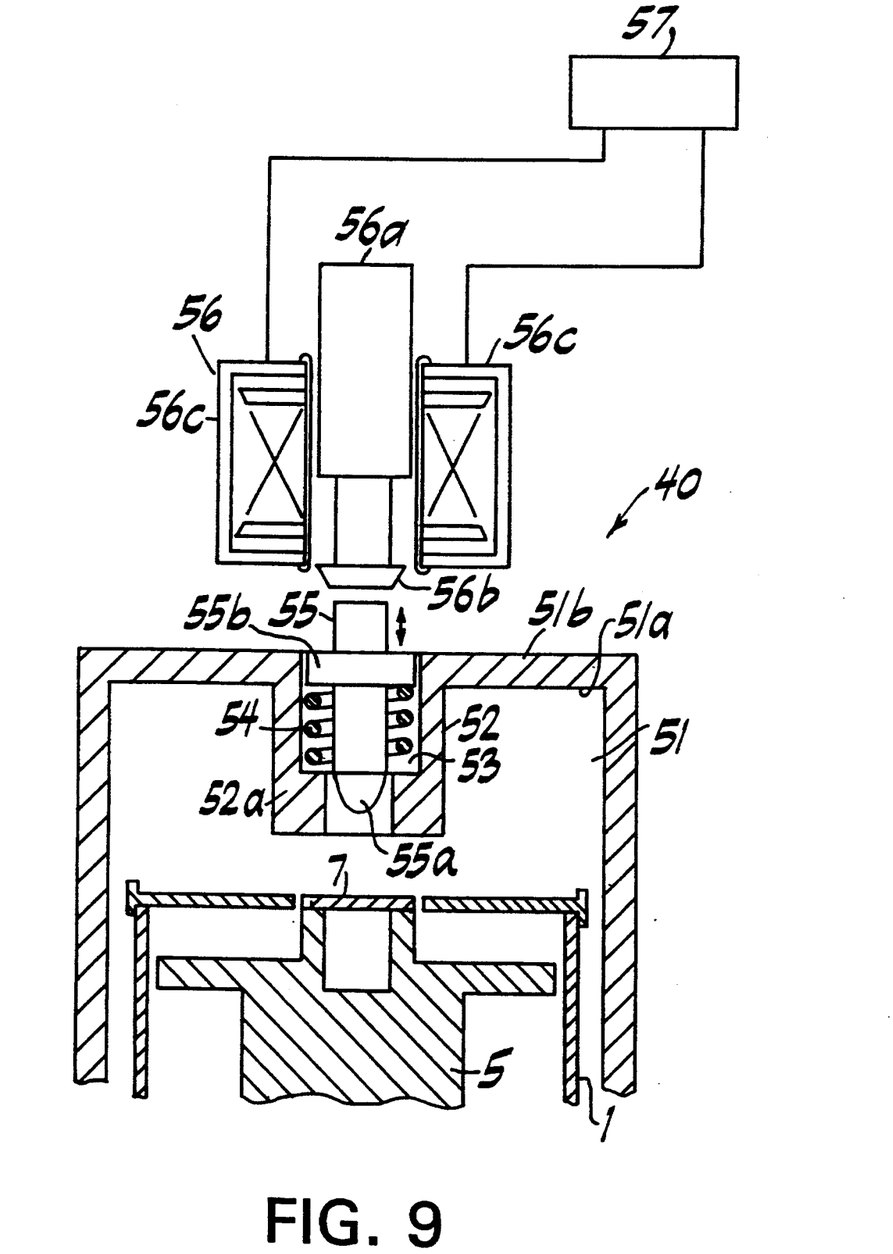
FIG. 9 is an enlarged cross-sectional view showing a main part of a mechanism for breaking an information indicating thin film in the camera in FIG. 5.

FIG. 9 shows the detail of the thin-film breaking mechanism shown in FIG. 5. The film cartridge 1 loaded in the camera of this embodiment is loaded in a cartridge chamber 51 of the camera having the magnetic recording means of this embodiment, with the information indicating thin film 7 provided on the cartridge 1 facing upward. On the upper inner surface 51a of the cartridge chamber 51, a guide member 52 is formed over the information indicating thin film 7. The guide member 52 has a short cylindrical form, projects toward the inside of the cartridge chamber and is provided in its central hollow portion 53 with an expansible coil spring 54. The coil spring 54 is prevented from falling down by a guide stopper portion 52a formed by a flange protruding inward from the lower part of the guide member 52.

A protruding member 55 is disposed through the center of the coil spring 54 provided in the hollow portion 53. The protruding member 55 is provided at its top with a cone-shaped protruding portion 55a, which faces the information indicating thin film 7 of the cartridge 1 loaded below. The protruding member 55 is also provided at its upper end with a flange portion 55b for compressing the coil spring 54 when the protruding member 55 is pushed down. The flange portion 55b usually rests in the horizontal position at nearly the same level with the upper surface of the ceiling 51b of the cartridge chamber 51. Over the protruding member 55, a plunger 56a of a solenoid 56 is disposed so as to move up and down to press the protruding member 55. The plunger 56a is provided at its lower end with a disc-shaped pushing portion 56b in order to surely push the upper end face of the protruding member 55. An exciting coil 56c is coiled around the plunger 56a of the solenoid 56, and both terminals of the coil are connected to a driver circuit 57.

In the camera having the mechanism so constructed, if panoramic or pseudo-zooming photographing has been made, a signal for breaking the information indicating thin film 7 is inputted from a CPU (not shown) to the driver circuit 57. The driver circuit 57 causes a current to flow through the coil 56c of the solenoid 56 to move the plunger 56a of the solenoid 56 downward to push down the protruding member 55 disposed under the plunger 56a. The protruding member 55 moves down against the upward force of the coil spring 54. When the protruding member 55 moves down, the protruding portion 55a of the protruding member 55 pushes and breaks the information indicating thin film 7. Since the protruding member 55 has the flange portion 55b, the protruding member 55 cannot move down beyond a predetermined limit where the coil spring 54 is compressed.

After the information indicating thin film 7 is broken, the driver circuit 57 releases the drive of the solenoid 56, so that no current flows through the coil 56c of the solenoid 56 from the driver circuit 57 and the plunger 56a of the solenoid 56 returns to its initial position. Then, since the protruding member 55 is freed from the pressure from the plunger 56a, the protruding member 55 returns to its initial position owing to the restoring force of the coil spring 54.

What is claimed is:

1. In a camera in which a cartridge containing a film having a magnetic recording portion can be loaded, the improvement comprising:
    a cartridge comprising a first indicating member provided on one end face of the cartridge to be broken in response to the loading of the cartridge in the camera, and a second indicating member provided on the other end face of the cartridge to be broken in response to a special photographing operation, and
    a first breaking means for breaking the first indicating member, and a second breaking means for breaking the second indicating member.

2. The improvement of claim 1, wherein each of the first and second indicating members comprises a thin-film member.

3. The improvement of claim 1, wherein the cartridge comprises a spool shaft around which the film is wound, the spool shaft has upper and lower end faces, and the first and second indicating members are arranged on the upper and lower end faces, respectively, of the spool shaft.

4. The improvement of claim 1, wherein the cartridge comprises a spool shaft around which the film is wound, the first breaking means comprises a film feeding fork to be engaged with the spool shaft for feeding the film, and the second breaking means is provided opposite to the film feeding fork.

5. The camera of claim 1, wherein the second breaking means is always urged in the direction toward the second indicating member.

6. The improvement of claim 1, wherein the second breaking means protrudes, in response to at least one of writing operation on the magnetic recording portion, panoramic photographing operation, and pseudo-zooming operation, in the direction in which the second breaking means breaks the second indicating member.

7. In a camera in which a cartridge containing a film can be loaded, the improvement comprising:
    a cartridge comprising a first indicating member provided on one end face of the cartridge to be broken in response to the loading of the cartridge in the camera, and a second indicating member provided on the other end face of the cartridge to be broken in response to a special photographing operation, and
    a first breaking means for breaking the first indicating member, and a second breaking means for breaking the second indicating member.

8. A film cartridge for a camera, comprising:
    a first indicating member provided on one end face of the cartridge to be broken in response to the loading of the cartridge in the camera, and
    a second indicating member provided on the other end face of the cartridge to be broken in response to a special photographing operation.

9. The film cartridge of claim 8, wherein each of the first and second indicating members comprises a thin-film member.

10. The film cartridge of claim 8, wherein the cartridge comprises a spool shaft around which the film is wound, the spool shaft has upper and lower end faces, and the first and second indicating members are arranged on the upper and lower end faces, respectively, of the spool shaft.

11. The film cartridge of claim 8, wherein the cartridge comprises upper and lower caps, and the first and second indicating members are arranged on the upper and lower caps, respectively.

12. A film cartridge for a camera, comprising:
    a first indicating member, the indication state of which after the cartridge is loaded in the camera is changed with respect to the indication state of the first indicating member before the cartridge is loaded in the camera, and
    a second indicating member, the indication state of which after the cartridge is loaded in the camera is changed with respect to the indication state of the second indicating member before the cartridge is loaded in the camera, depending upon whether a special treatment in developing and/or printing the film is required or not,
    wherein each of the first and second indicating members comprises a thin-film member.

* * * * *

UNITED STATES PATENT AND TRADEMARK OFFICE
CERTIFICATE OF CORRECTION

PATENT NO. : 5,404,188
DATED : April 4, 1995
INVENTOR(S) : Shinya TAKAHASHI, et al.

It is certified that error appears in the above-indentified patent and that said Letters Patent is hereby corrected as shown below:

Column 4, line 5, change "began" to --begun--.

Column 6, line 65, change "proceeds" to --proceed--.

Column 7, line 59, before "42" insert --buffer--.

Column 8, line 35, change "Fist," to --First,--.

Column 9, line 46, change "TON" to --$T_{ON}$--.

Column 12, line 10, change "camera" to --improvement--.

Signed and Sealed this

Eighth Day of August, 1995

Attest:

BRUCE LEHMAN

*Attesting Officer*      *Commissioner of Patents and Trademarks*